US009838498B2

(12) United States Patent
Liu et al.

(10) Patent No.: US 9,838,498 B2
(45) Date of Patent: Dec. 5, 2017

(54) REMOTE DIRECT NON-VOLATILE CACHE ACCESS

(71) Applicant: ScaleFlux, San Jose, CA (US)

(72) Inventors: Yang Liu, Milpitas, CA (US); Hao Zhong, Los Gatos, CA (US); Fei Sun, Irvine, CA (US); Tong Zhang, Watervliet, NY (US)

(73) Assignee: ScaleFlux, San Jose, CA (US)

( * ) Notice: Subject to any disclaimer, the term of this patent is extended or adjusted under 35 U.S.C. 154(b) by 267 days.

(21) Appl. No.: 14/919,353

(22) Filed: Oct. 21, 2015

(65) Prior Publication Data

US 2016/0127494 A1 May 5, 2016

Related U.S. Application Data (60) Provisional application No. 62/072,978, filed on Oct. 30, 2014.

(51) Int. Cl.
| | |
|---|---|
| G06F 3/06 | (2006.01) |
| H04L 29/08 | (2006.01) |
| G06F 13/14 | (2006.01) |
| G06F 13/00 | (2006.01) |
| G06F 13/40 | (2006.01) |
| H04L 12/00 | (2006.01) |

(52) U.S. Cl.
CPC .......... *H04L 67/2842* (2013.01); *G06F 3/061* (2013.01); *G06F 3/067* (2013.01); *G06F 3/0646* (2013.01); *G06F 3/0647* (2013.01); *G06F 3/0655* (2013.01); *G06F 13/00* (2013.01); *G06F 13/14* (2013.01); *G06F 13/4022* (2013.01); *H04L 12/00* (2013.01)

(58) Field of Classification Search
CPC ........ G06F 3/067; G06F 3/061; G06F 3/0646; G06F 3/0655; G06F 3/0647; G06F 3/0605; G06F 13/00; G06F 13/14; G06F 13/4022; G06F 13/128; G06F 13/28; G06F 13/385; G06F 13/4059; G06F 5/14; H04L 67/2842; H04L 12/00; H04L 1/0083; H04L 45/38
See application file for complete search history.

(56) References Cited

U.S. PATENT DOCUMENTS

| | | | | |
|---|---|---|---|---|
| 2002/0069245 A1* | 6/2002 | Kim | ...................... | G06F 3/0605 709/203 |
| 2007/0014245 A1* | 1/2007 | Aloni | ................... | G06F 13/128 370/252 |

(Continued)

*Primary Examiner* — Le H Luu
(74) *Attorney, Agent, or Firm* — Hoffman Warnick LLC (57) ABSTRACT

A system and method of providing direct data access between a non-volatile cache and a NIC in a computing system. A system is disclosed that includes a processing core embedded in a controller that controls a non-volatile cache; and a direct access manager for directing the processing core, wherein the direct access manager includes: a switch configuration system that includes logic to control a switch for either a remote direct access mode or a host access mode, wherein the switch couples each of the NIC, a local bus, and the non-volatile cache; a command processing system that includes logic to process data transfer commands; and a data transfer system that includes logic to manage the flow of data directly between the non-volatile cache and the NIC.

20 Claims, 8 Drawing Sheets

(56) References Cited

U.S. PATENT DOCUMENTS

| | | | |
|---|---|---|---|
| 2011/0040771 A1* | 2/2011 | Gilyadov | G06F 13/385 707/754 |
| 2014/0029617 A1* | 1/2014 | Wang | H04L 45/38 370/392 |
| 2014/0032795 A1* | 1/2014 | Krause | G06F 13/4059 710/29 |
| 2014/0164545 A1* | 6/2014 | Davis | G06F 13/28 709/212 |
| 2014/0344488 A1* | 11/2014 | Flynn | G06F 5/14 710/52 |
| 2015/0067229 A1* | 3/2015 | Connor | G06F 13/4022 710/317 |
| 2015/0186201 A1* | 7/2015 | Ran | H04L 1/0083 714/4.5 |

\* cited by examiner

REMOTE DIRECT NON-VOLATILE CACHE ACCESS

PRIORITY CLAIM

This application claims priority to U.S. Provisional Patent Application Ser. No. 62/072,978, filed Oct. 30, 2014, which is hereby incorporated herein as though fully set forth.

TECHNICAL FIELD

The present invention relates to the field of storage system and particularly to providing data transmission when cache and multiple networking storage systems are used.

BACKGROUND

In computing, cache is a component that transparently stores data so that future requests for that data can be served faster. A non-volatile cache is a cache that can persistently store the data even when not being powered. Non-volatile cache can provide thousands times of more storage space than normal local memories embedded in a computer host. Non-volatile cache shares a data bus as other block storage devices in a computer system. In computing, remote direct memory access (RDMA) is a direct memory access from the memory of one computer host into that of another without involving either operating system. This permits high-throughput and low-latency networking, which is especially useful in massively parallel computer clusters. A network interface controller (NIC) is a computer hardware component that connects a computer system to a computer network.

SUMMARY

Accordingly, an embodiment of the present disclosure is directed to a method for remote direct non-volatile cache access from other network storage systems. The method includes exposing non-volatile cache space to other network storage systems; initiating RDMA from NIC; arbitrating the incoming requests between direct memory access (DMA) and direct non-volatile cache access across networks.

In a first aspect, the invention provides a system for providing direct data access between a non-volatile cache and a network interface card (NIC) in a computing system, comprising: a processing core embedded in a controller that controls a non-volatile cache; and a direct access manager for directing the processing core, wherein the direct access manager includes: a switch configuration system that includes logic to control a switch for either a remote direct access mode or a host access mode, wherein the switch couples each of the NIC, a local bus, and the non-volatile cache; a command processing system that includes logic to process data transfer commands; and a data transfer system that includes logic to manage the flow of data directly between the non-volatile cache and the NIC.

In a second aspect, the invention provides a computing system, comprising: a host having a local memory and PCIe root complex; a bus that couples the host to a PCIe switch; a network interface card (NIC) and a non-volatile cache coupled to the PCIe switch; a remote direct access PCIe controller card coupled to the non-volatile cache that provides direct data access between the non-volatile cache and the NIC, wherein the remote direct access PCIe controller card includes: a processing core; a direct access manager for controlling the processing core, wherein the direct access manager includes: a switch configuration system that includes logic to control the PCIe switch between a direct access mode and a host access mode; a command processing system that includes logic to process data transfer commands; and a data transfer system that includes logic to manage the flow of data directly between the non-volatile memory and the NIC; and an arbitrator that schedules data traffic flow through the PCIe switch.

In a third aspect, the invention provides a method of providing direct data access between a non-volatile cache system and a network interface card (NIC) in a computing system, wherein the computing system further includes a host, host local memory, a root complex and a switch, the method comprising: providing a controller that is coupled to and controls a non-volatile cache; receiving at the controller a command from the host to transfer data between the non-volatile cache and the NIC; generating and sending a command from the controller to configure the switch to allow a direct data transfer between the non-volatile cache and NIC; generating and sending a data transfer command from the controller to the NIC; and implementing the data transfer directly through the switch between the non-volatile cache and the NIC.

BRIEF DESCRIPTION OF THE DRAWINGS

The numerous advantages of the present invention may be better understood by those skilled in the art by reference to the accompanying figures in which.

Reference will now be made in detail to the presently preferred embodiments of the invention, examples of which are illustrated in the accompanying drawings.

DETAILED DESCRIPTION

Figure 1:
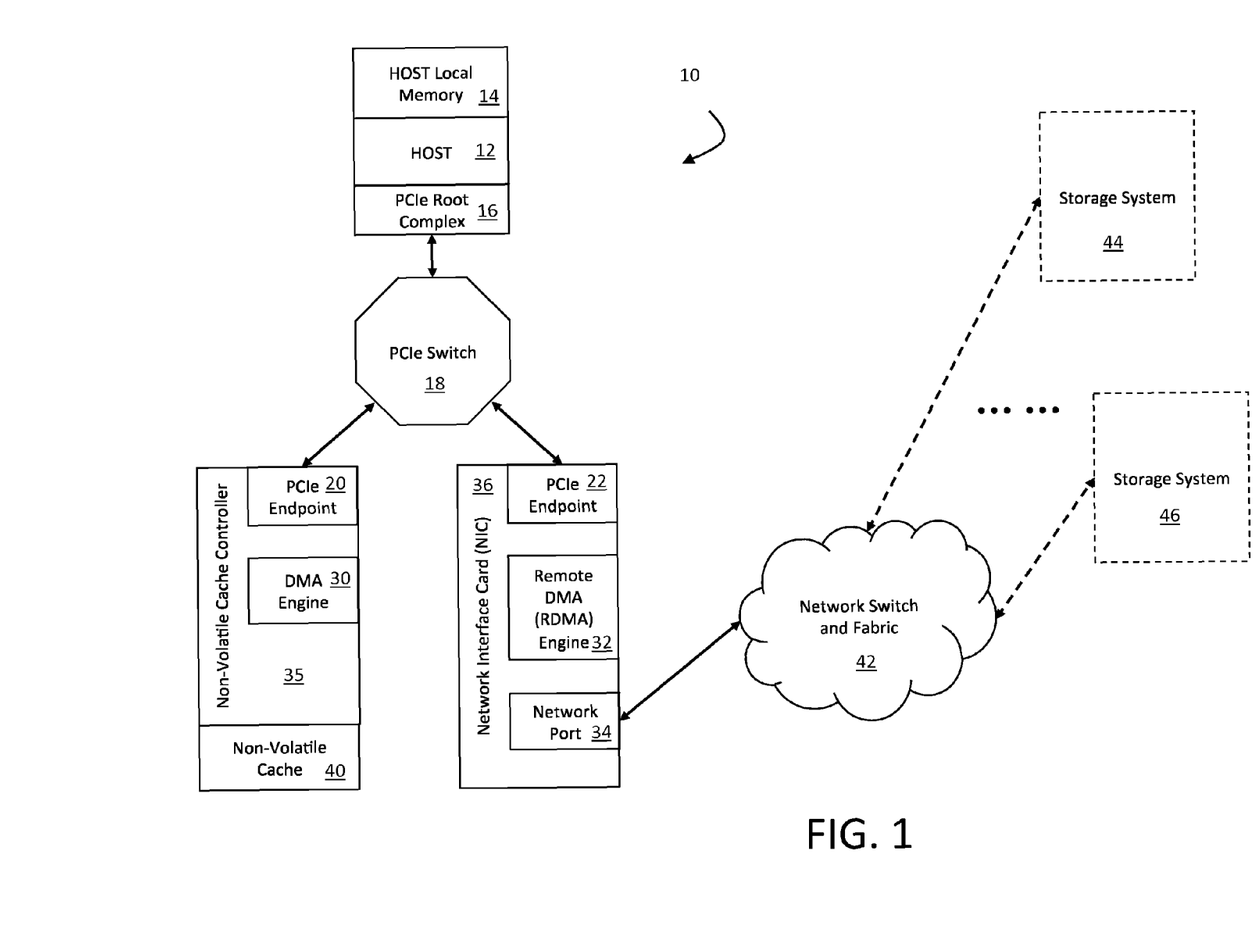
FIG. 1 is a block diagram illustrating connection of host, memory, non-volatile cache controller, NIC, and network storage devices in a computer network.

FIG. 1 depicts a computing system 10 having a storage architecture, such as that used in data centers, cloud computing, and other facilities to store and manage data, using PCI Express (PCIe) technology. Unlike shared parallel bus architectures, PCIe is based on a point-to-point topology in which separate serial links connect every device to the root complex 16 (i.e., host). Accordingly, a PCIe bus link supports full-duplex communication between any two endpoints, with no inherent limitation on concurrent access across multiple endpoints. PCIe endpoints 20, 22, are typically implemented as cards that plug into an associated device. Root complex 16 connects the Host (i.e., CPU) 12 and Host local memory 14 to the PCIe switch fabric composed of one or more switches 18.

The PCIe root complex 16 generates transaction requests on behalf of the host 12, which is interconnected through a local bus 28. Root complex 16 functionality may be implemented as a discrete device, or may be integrated with the host 12. A root complex 16 may contain more than one PCIe port and multiple switches 18 can be connected to ports on the root complex 16 or cascaded.

As shown in FIG. 1, host 12 accesses its local memory 14 through an exclusive local bus. Non-volatile cache 40 and NIC 36 are accessible through a shared bus to host 12. Each non-volatile cache 40 or NIC 36 is controlled via a PCIe endpoint 20, 22. These PCIe endpoints 20, 22 are connected to PCIe switch 18 that connects to a PCIe root complex 16 in host 12. NIC 36 transmits or receives data between host local memory 14 and other network storage systems 44, 46 via a network switch fabric 42.

Figure 2:
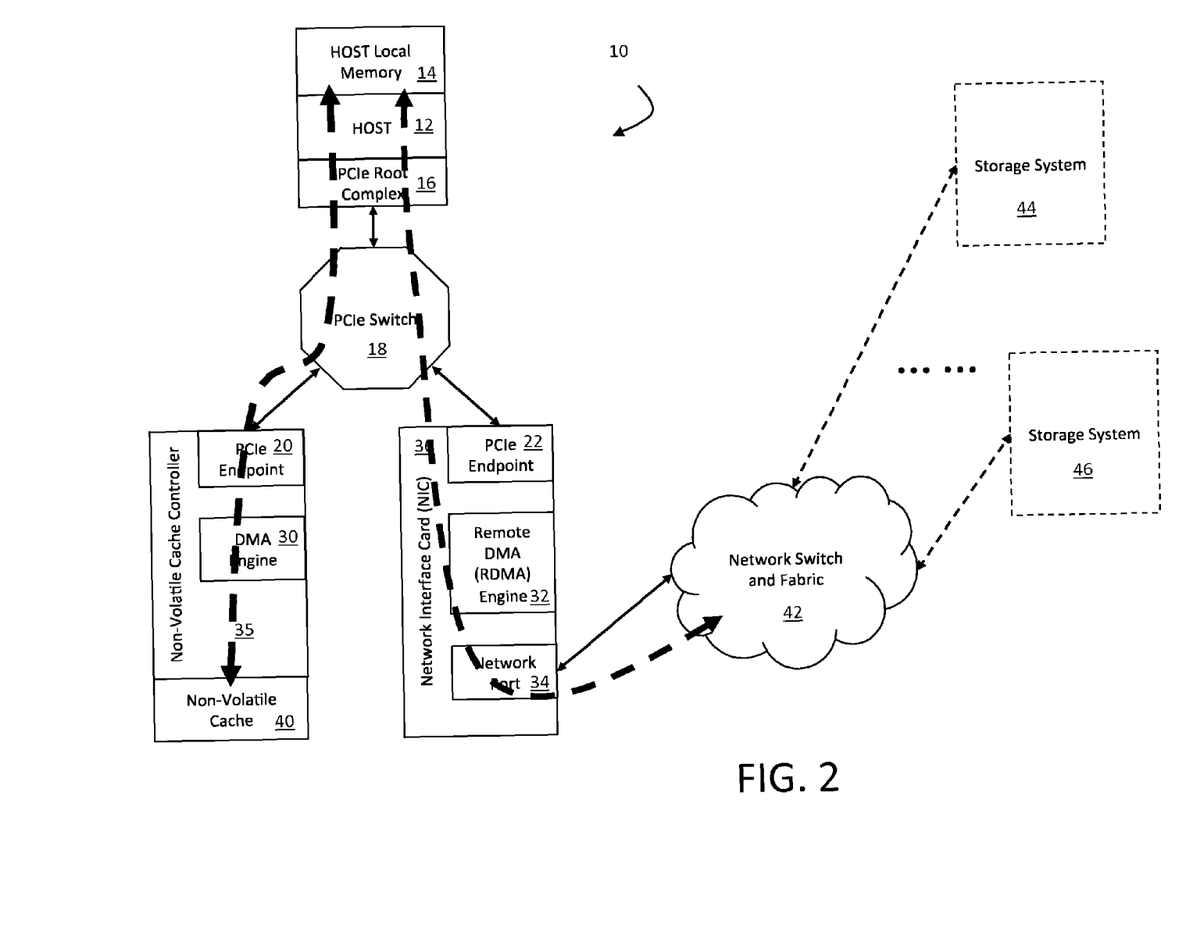
FIG. 2 is a block diagram illustrating data flows between host, memory, non-volatile cache controller, NIC, and network storage devices in a computer network.

In order to off-load host workload, a DMA engine 30 is implemented in each non-volatile cache controller 35. The DMA engine 30 initiates PCIe transactions to read data from or write data to host local memory 14. Similarly, to offload host workload from processing network protocols and intermediate data buffering, an RDMA engine 32 is implemented in each NIC 36. As shown in FIG. 2, all the data movements between non-volatile cache 40 and NIC 36 go through PCIe switch 18 and aggregate to PCIe root complex 16, host 12, and host local memory 14. Accordingly, the host 12 still needs to be heavily involved in the data movement. Unfortunately, the bandwidth of PCIe root complex 16 and host local memory 14 are not scalable and thus become a bottleneck of data transmission as the number of storage systems 44, 46, etc., continues to increase.

Figure 3:
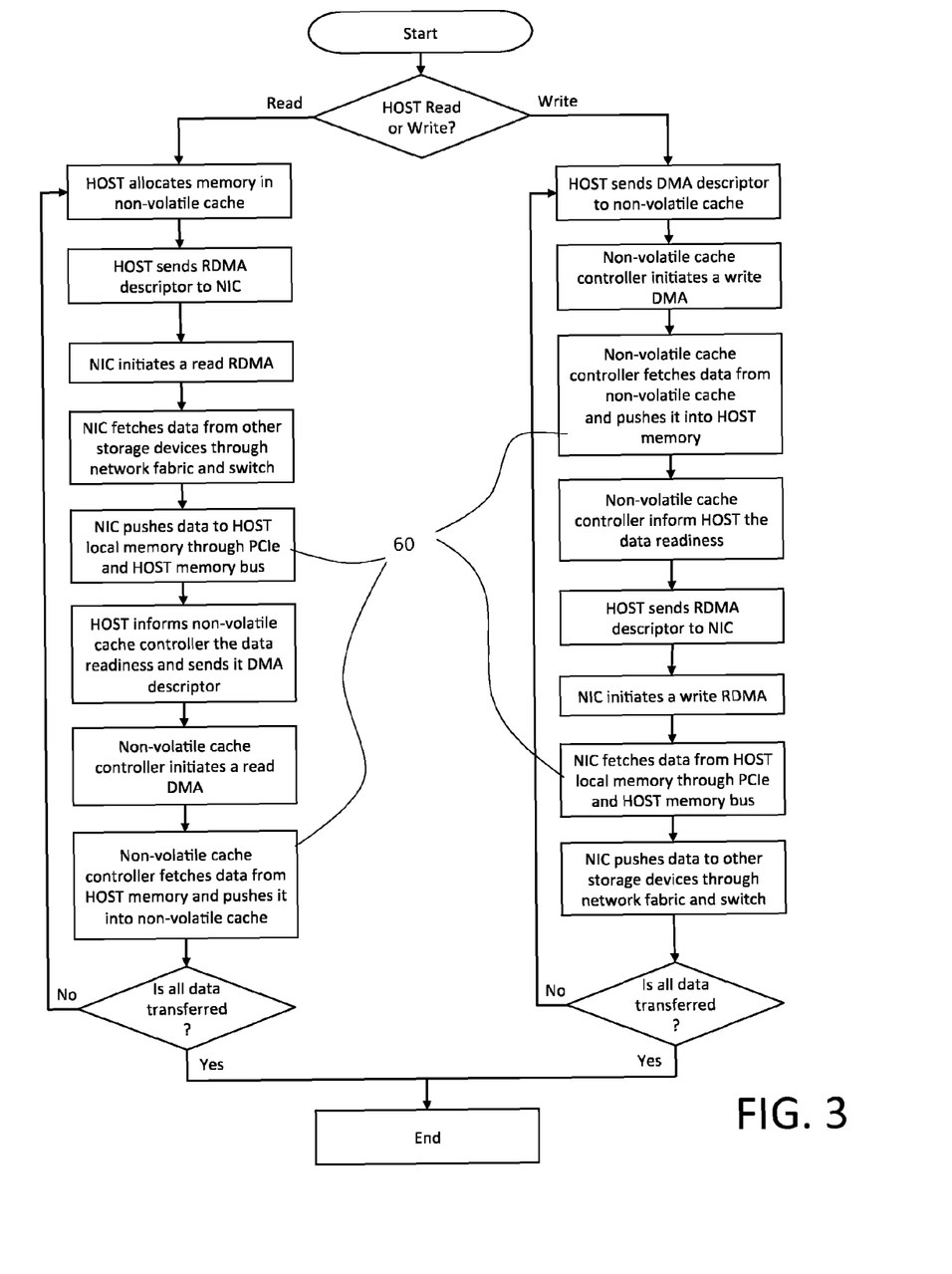
FIG. 3 is a flow diagram in the case of traditional RDMA to non-volatile cache.

FIG. 3 is a flow diagram illustrating the traditional operations for a data movement over network storage systems and non-volatile cache 40. As can be seen, e.g., by reference number 60, in order to move any data between NIC 36 and non-volatile cache 40, the DMA engine 30 from non-volatile cache controller 35 is required to move data between non-volatile cache 40 and host local memory 14. In addition, NIC 36 needs to initiate RDMA and transfer data in host local memory 14 over the network switch and fabric 42.

Figure 4:
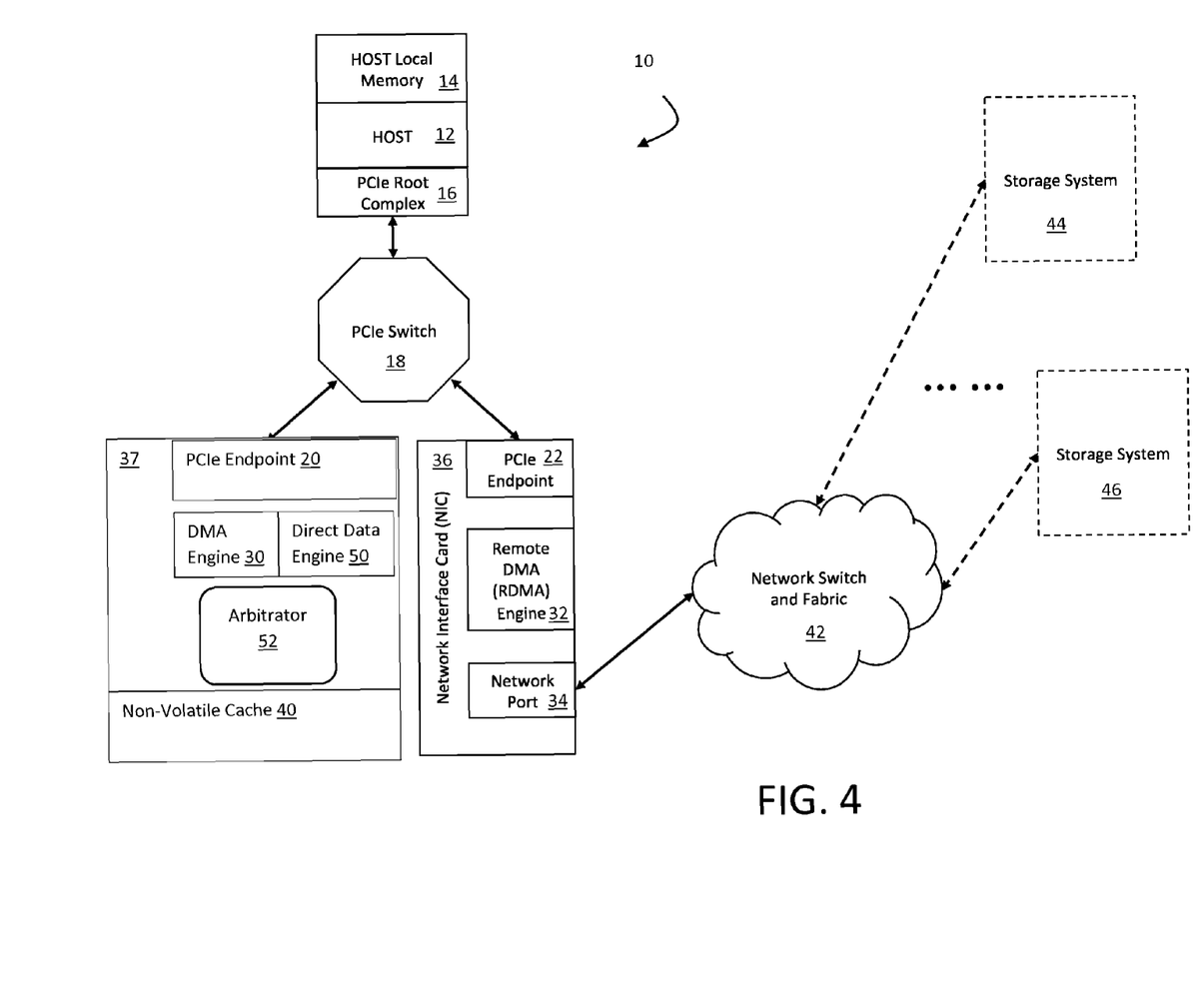
FIG. 4 is a block diagram illustrating connection of host, memory, non-volatile cache controller with remote direct access support, NIC, and network storage devices in a computer network according to embodiments.
Figure 5:
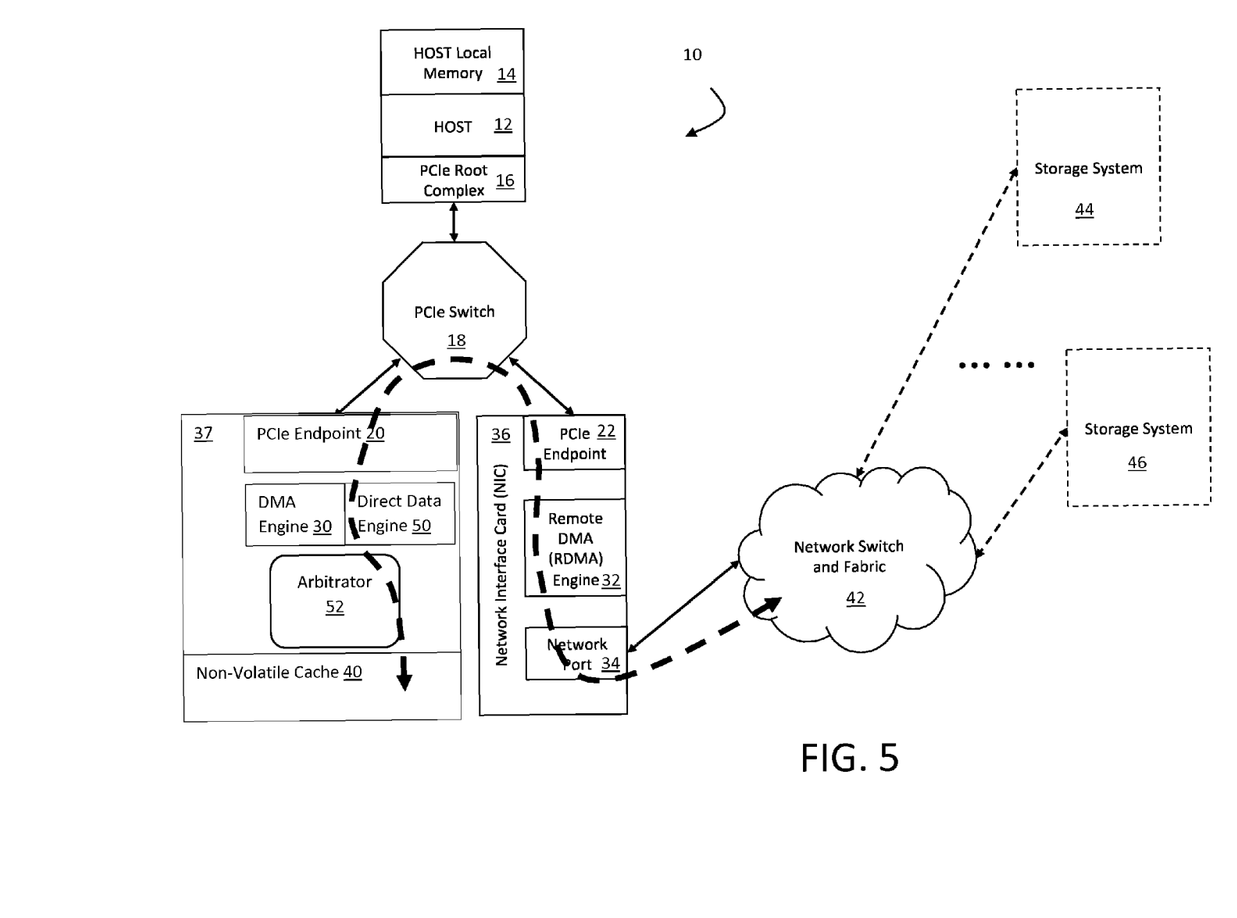
FIG. 5 is a block diagram illustrating data flows between host, memory, non-volatile cache controller with remote direct access support, NIC, and network storage devices in a computer network according to embodiments.

To address this problem, the present approach provides a remote direct access mode implemented and controlled at the non-volatile cache controller 37 that allows data to be directly read/written between the non-volatile cache 40 and a NIC 36 via PCIe switch 18, as shown in FIG. 4. In this embodiment, a direct data engine 50 is implemented along with the DMA engine 50. The direct data engine 50 can take perform direct PCIe data read/write operations with NIC 36, thereby bypassing PCIe root complex 16, host 12, and host local memory 14. FIG. 5 shows the flow of data in the remote direct access mode. Direct data engine 50 includes a specialized processor that allows the PCIe endpoint 20 to issue commands (similar to those issued by host 12) to the PCIe switch 18 and PCIe endpoint 22 that will read/write data directly between the non-volatile cache 40 and storage systems 44, 46. Thus, the non-volatile cache 40 is able to, e.g., read data from a storage system 44 without the data passing through the host local memory 14. An arbitrator 52 arbitrates and schedules the traffic for both traditional DMA host access requests and remote direct access requests.

Figure 6:
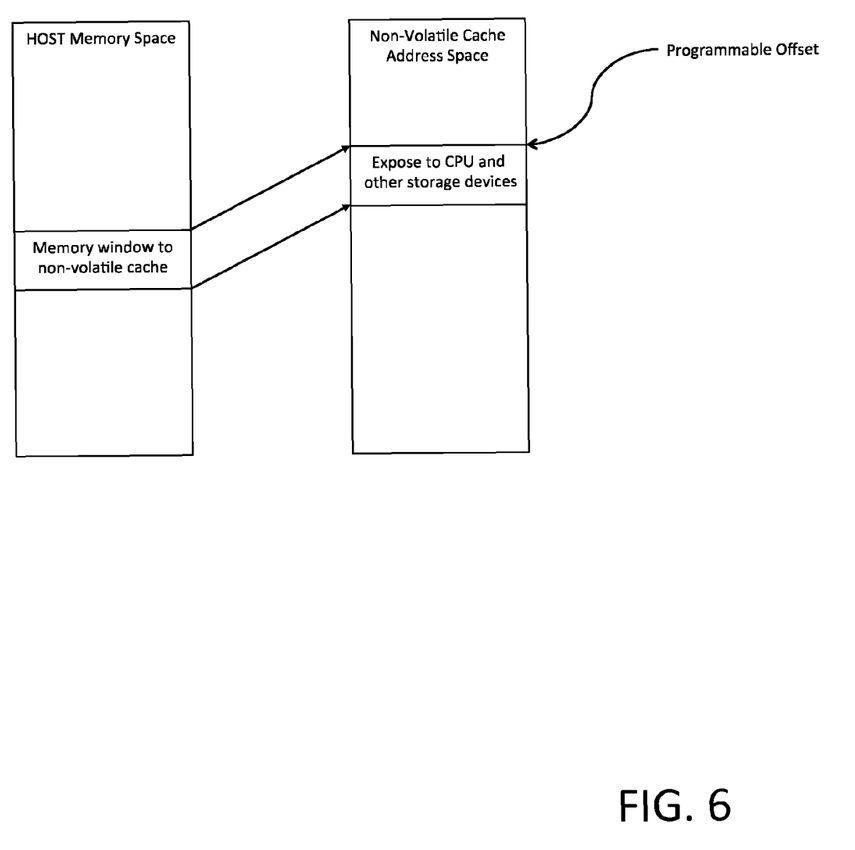
FIG. 6 is a block diagram illustrating a method for mapping non-volatile cache address to system memory address according to embodiments.

The address of non-volatile cache is mapped to the system memory address with a programmable offset, as illustrated in FIG. 6. With the programmable address offset, any portion of the non-volatile cache is accessible to other devices in the system.

Figure 7:
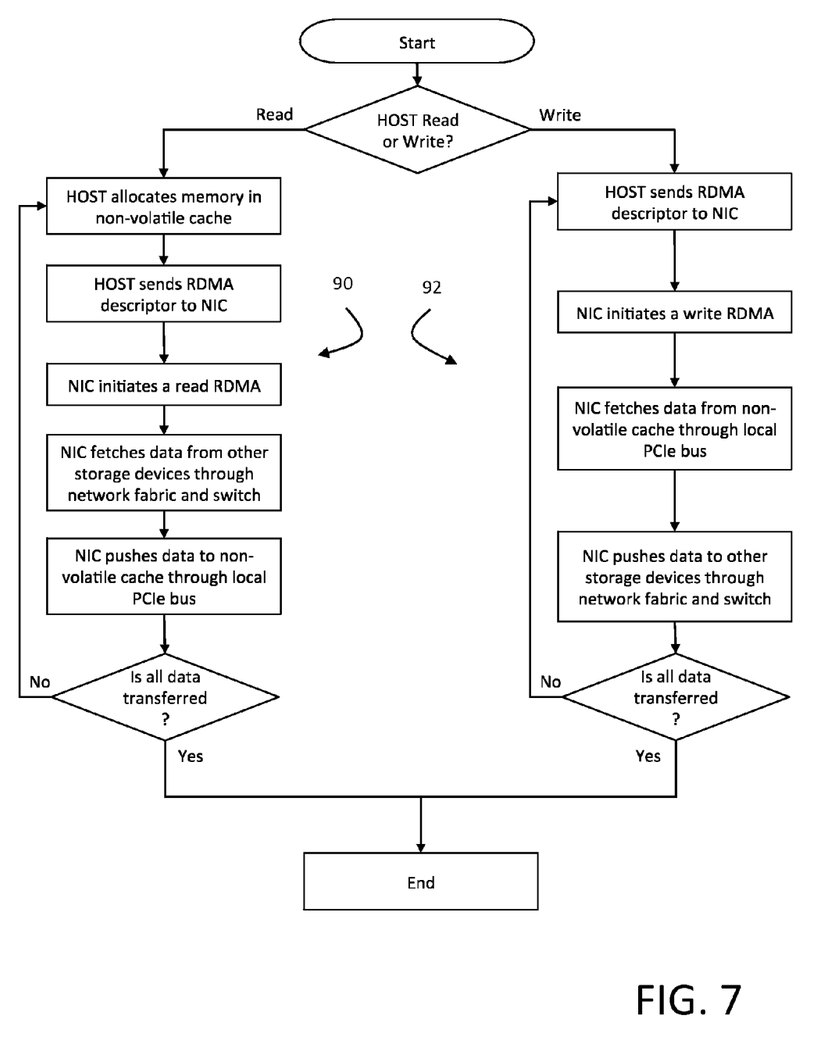
FIG. 7 is a flow diagram illustrating the case of remote direct non-volatile cache access according to embodiments.

FIG. 7 shows a flow diagram illustrating the direct cache data movement over network storage systems 44, 36. The left hand side shows a read operation 90, while the right hand side shows a write operation 92. One the read side, the steps include the host 12 allocating memory in the non-volatile cache 42 and sending an RDMA descriptor to the NIC 36. The NIC 35 then initiates a read RDMA and the fetches data from storage devices (i.e., storage systems 44, 46) through the network fabric and switch 42. Finally the NIC pushes the data to the non-volatile cache through the local PCIe bus and PCIe switch 18 and loops until all the data is transferred.

In the write operation 92, host 12 sends an RDMA descriptor to the NIC 36 and the NIC initiates a write RDMA. Next, the NIC fetches data from the non-volatile cache through the local PCIe bus and switch 18 and pushes the data to the target storage devices via the network fabric and switch 42. The process loops until all the data is transferred.

Accordingly, the host 12 only needs to set up the transaction at the beginning of the operations, while the NIC RDMA 32 initiates the rest of the intensive data movement. In the case of RDMA 32 initiated from NIC 36, the PCIe switch 18 directs the requests to the non-volatile cache 40 instead of host PCIe root complex 16. The host local memory 14 is not involved in the data transmission. The internal arbitrator 52 in the non-volatile cache controller 37 arbitrates and schedules the operations between the traffic flows on both DMA requests and direct PCIe requests.

The host 12 sends commands to the non-volatile cache controller 37 to provide the data transfer task specifications, and accordingly the controller 35 configures the PCIe switch 18 to the appropriate mode in order to carry out the corresponding data transfer. The arbitrator 52 determines whether the DMA engine 30 or Direct Data Engine 50 can read/write data from/to the non-volatile cache 40. The controller 37 configures the mode of the arbitrator 52 based upon the current data transfer task specifications.

Figure 8:
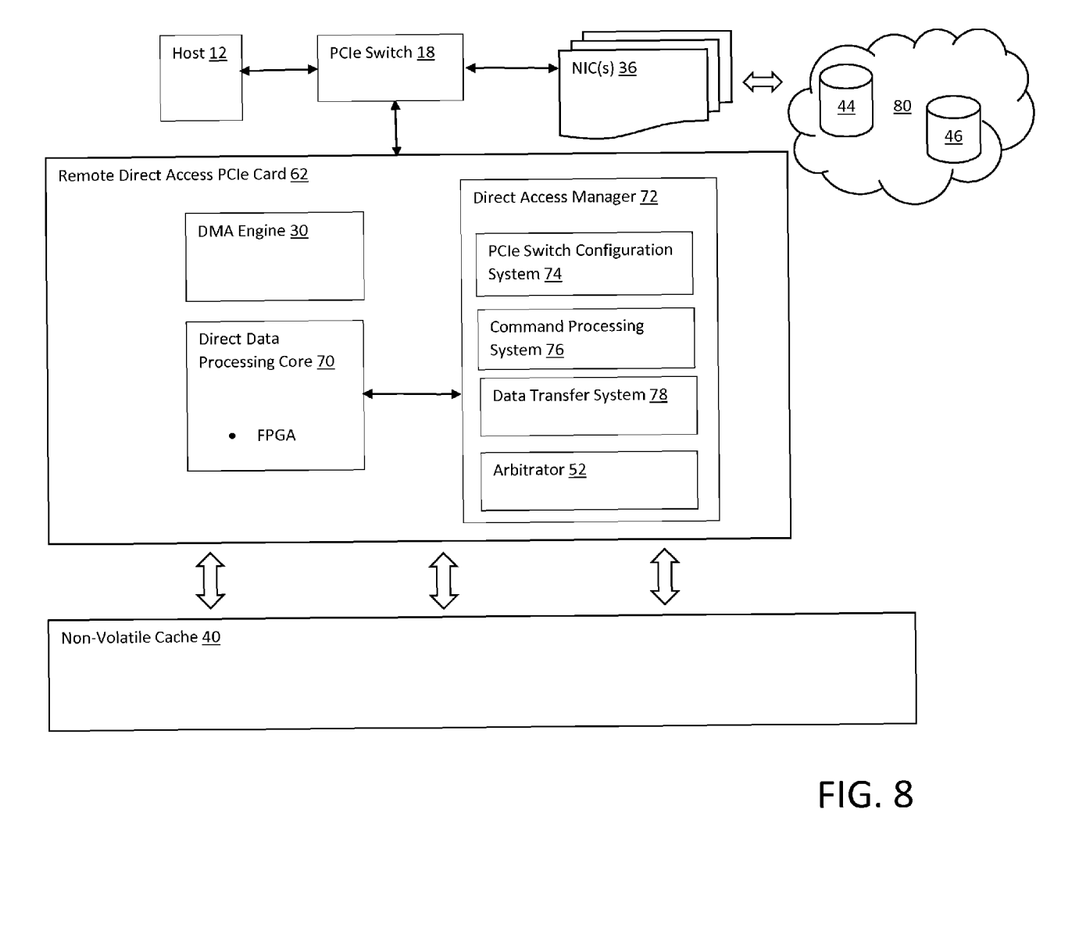
FIG. 8 depicts a PCIe card having a direct data engine according to embodiments.

FIG. 8 depicts an illustrative embodiment of a remote direct access PCIe card 62 that is adapted to plug into or otherwise connect to a non-volatile cache 40. Non-volatile cache 40 generally includes some type of electronically addressable semiconductor memory such as RAM, Flash Memory, etc. Conversely, traditional network based storage systems 44, 46 generally comprise some type of slower data storage such as magnetic or optical media. As described herein, remote direct access PCIe card 62 includes all of the features of a traditional PCIe card (i.e., an endpoint) such as DMA engine 30, but also includes an infrastructure for facilitating the transfer of data directly to and from storage systems 44, 46 on an external network 80 via one or more NICs 36.

In addition to standard PCIe end-point components, direct access PCIe card 62 implements a direct data engine that includes: (1) a direct access processing core 70, which may for example be implemented using FPGA (field programmable gate array) technology, ASIC technology, or any other known system; and a direct access manager 72. Direct access manager 72 may for example comprises a memory storage area that stores programming logic modules for controlling the direct access processing core 70. In other embodiments, some or all of direct access manager 72 may be implemented in hardware or a combination of software and hardware.

In this illustrative embodiment, direct access manager 72 includes: (1) a PCIe switch configuration system 74 for configuring the PCIe switch 18 to utilize traditional read/write operations via host 12 (host access mode), or utilize direct access operations with a selected NIC 36 (direct access mode); (2) a command processing system 76 for generating/receiving and otherwise processing read/write commands to/from NIC 36; and (3) a data transfer system 78 for managing the direct access data flows between the non-volatile cache system 51 and NIC 36. In this embodiment, arbitrator 52 is also implemented in software and includes logic to arbitrate and schedule the traffic flows through PCIe switch 18 to and from non-volatile cache system 52. For example, arbitrator 52 will manage and schedule direct access data transfers and host access data transfers via PCIe switch 18 using any known logic, e.g., based on priority, first-in first-out, etc.

This approach of implementing remote direct non-volatile cache access across devices is fully scalable. Additional non-volatile cache 40 can be added if more caches are needed. It is contemplated that either the non-volatile cache 40 or the NIC 36 in question may use other bus protocols, such as Infiniband, and be attached to a PCIe switch through a PCIe bridge. In such a PCIe system, the RDMA engines in the NIC can still go through the local bus and then PCIe bridge, PCIe switch to the non-volatile cache, without departing from the spirit and scope of the present disclosure.

The method and system in accordance with an embodiment of the present disclosure is applicable to various types of storage devices without departing from the spirit and scope of the present disclosure. It is also contemplated that the term network interface controller may refer to either logical and/or physical network controller, adapter or card, and the term host may refer to various devices capable of sending read/write commands to the storage devices. It is understood that such devices may be referred to as processors, hosts, initiators, requesters or the like, without departing from the spirit and scope of the present disclosure.

It is to be understood that the present disclosure may be conveniently implemented in forms of a software package. Such a software package may be a computer program product that employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

The invention claimed is:

1. A system for providing direct data access between a non-volatile cache and a network interface card (NIC) in a computing system, comprising:
    a processing core embedded in a controller that controls a non-volatile cache; and
    a direct access manager for directing the processing core, wherein the direct access manager includes:
        a switch configuration system that includes logic to control a switch for either a remote direct access mode or a host access mode, wherein the switch couples each of the NIC, a local bus, and the non-volatile cache;
        a command processing system that includes logic to process data transfer commands; and
        a data transfer system that includes logic to manage the flow of data directly between the non-volatile cache and the NIC.

2. The system of claim 1, wherein the computing system utilizes a PCIe infrastructure and the controller comprises a PCIe controller card.

3. The system of claim 1, wherein the processing core comprises a field programmable gate array (FPGA) device.

4. The system of claim 1, wherein the computing system includes a host, host local memory and a PCIe root complex and wherein the direct access manager further includes an arbitrator that arbitrates and schedules data traffic flow through the switch.

5. The system of claim 4, wherein the controller includes a direct memory access (DMA) engine for transferring data between the non-volatile cache and the host local memory in the host access mode.

6. The system of claim 1, wherein the NIC is connected to an external network of storage systems.

7. The system of claim 1, wherein the non-volatile cache comprises non-volatile RAM (random access memory).

8. A computing system, comprising:
    a host having a local memory and PCIe root complex;
    a bus that couples the host to a PCIe switch;
    a network interface card (NIC) and a non-volatile cache coupled to the PCIe switch;
    a remote direct access PCIe controller card coupled to the non-volatile cache that provides direct data access between the non-volatile cache and the NIC, wherein the remote direct access PCIe controller card includes:
        a processing core;
        a direct access manager for controlling the processing core, wherein the direct access manager includes:
            a switch configuration system that includes logic to control the PCIe switch between a direct access mode and a host access mode;
            a command processing system that includes logic to process data transfer commands; and
            a data transfer system that includes logic to manage the flow of data directly between the non-volatile memory and the NIC; and
        an arbitrator that schedules data traffic flow through the PCIe switch.

9. The computing system of claim 8, wherein the processing core comprises a field programmable gate array (FPGA) device.

10. The computing system of claim 8, wherein the direct access PCIe controller card includes a direct memory access (DMA) engine for transferring data between the non-volatile cache and the NIC.

11. The computing system of claim 8, wherein the NIC is connected to an external network of storage systems.

12. The computing system of claim 8, wherein the non-volatile cache comprises non-volatile RAM (random access memory).

13. A method of providing direct data access between a non-volatile cache system and a network interface card (NIC) in a computing system, wherein the computing system further includes a host, host local memory, a root complex and a switch, the method comprising:
- providing a controller that is coupled to and controls a non-volatile cache;
- receiving at the controller a command from the host to transfer data between the non-volatile cache and the NIC;
- generating and sending a command from the controller to configure the switch to allow a direct data transfer between the non-volatile cache and NIC;
- generating and sending a data transfer command from the controller to the NIC; and
- implementing the data transfer directly through the switch between the non-volatile cache and the NIC.

14. The method of claim 13, wherein the computing system utilizes a PCIe infrastructure and the controller includes a PCIe controller card.

15. The method of claim 13, wherein the wherein the controller card includes a processing core implemented with a field programmable gate array (FPGA) device.

16. The method of claim 15, wherein the controller card includes a direct memory access (DMA) engine for transferring data between the non-volatile cache and the host local memory.

17. The method of claim 13, wherein the NIC is connected to an external network of storage systems.

18. The method of claim 17, wherein the external network of storage systems includes storage device utilizing one of magnetic media and optical media.

19. The method of claim 13, wherein the non-volatile cache comprises non-volatile RAM (random access memory).

20. The method of claim 13, further comprising utilizing the controller to arbitrate traffic flow on the switch.

* * * * *